United States Patent [19]

Coutts et al.

[11] Patent Number: 5,814,144
[45] Date of Patent: *Sep. 29, 1998

[54] AQUEOUS NON-BLOCKING TINTER FOR PAINTS

[75] Inventors: Jennifer Ruth Coutts, Wraysbury; Jonathan Albert Graystone, Maidenhead; Trevor Stephen Beverley Sayer, Woosehill, all of England

[73] Assignee: Imperial Chemical Industries PLC, London, England

[ * ] Notice: The term of this patent shall not extend beyond the expiration date of Pat. No. 5,340,394.

[21] Appl. No.: 509,757

[22] Filed: Aug. 3, 1995

Related U.S. Application Data

[63] Continuation of Ser. No. 338,432, Apr. 15, 1994, abandoned, which is a continuation of Ser. No. 79,257, Jun. 21, 1993, abandoned, which is a continuation-in-part of Ser. No. 962,685, Oct. 19, 1992, abandoned.

[51] Int. Cl.$^6$ ....................................................... C08K 5/00
[52] U.S. Cl. ............................................ 106/499; 106/311
[58] Field of Search .................................... 106/499, 311

[56] References Cited

U.S. PATENT DOCUMENTS 4,443,263  4/1984  Dietz et al. ........................ 106/287.24
5,340,394  8/1994  Elsamanoudi ............................ 106/500

FOREIGN PATENT DOCUMENTS

861223     2/1961  United Kingdom .
2 037 819  7/1980  United Kingdom .

Primary Examiner—Mark L. Bell
Assistant Examiner—Scott L. Hertzog
Attorney, Agent, or Firm—Pillsbury Madison & Sutro LLP

[57] ABSTRACT

For paints and the like, an aqueous tinter which does not block dispensing nozzles and which has a viscosity of from 0.05 to 1.5 $Ns/m^2$ (20° C.) and which contains pigment particles, water, micellising dispersant and a non-micellising auxiliary material. The weight ratio of dispersant to pigment must exceed the ratio which would be present at the Daniel Flow Point for a notional tinter consisting only of the pigment, water and the dispersant. The amount of auxiliary material must be sufficient to enable the tinter to be expelled through a bore 2 mm in diameter and 15 mm long by a pressure of not more than 320 $MN/m^2$ after storage in the bore at 25° C. for 18 hours under a relative humidity of 50%. Preferred dispersants comprise long chain hydrophilic and long chain hydrophobic moieties which may be poly (alkylene glycol) esters of long chain fatty acids or hydrophobic backbone copolymers with pendant poly(alkylene glycol) moieties as hydrophilic side chains.

12 Claims, 1 Drawing Sheet

AQUEOUS NON-BLOCKING TINTER FOR PAINTS

This Application is a continuation of a application Ser. No. 08/338,432 filed Apr. 15, 1994, abandoned which is a continuation of application Ser. No. 79,257, filed Jun. 21, 1993, now abandoned, which is a Continuation in Part of U.S. patent application Ser. No. 07/962,685 filed on 19 Oct., 1992 abandoned.

This invention relates to an aqueous non-blocking tinter for paints (especially aqueous paints) or similar coating compositions. The invention is particularly useful with so-called "decorative" paints, varnishes, woodstains or timber preservatives which are formulated to dry at ambient temperatures and humidities and to be applicable by brush, roller, pad and/or spray to architectural surfaces, fittings or furnishings, that is to say surfaces usually found in buildings or on furniture.

Tinters are non-film-forming compositions which currently contain particulate solid pigment dispersed in volatile liquid capable of reasonably rapid evaporation at ambient temperatures of say 5° to 30° C. and relative humidities of 40 to 60%. They are mixed into paint or similar coating compositions to impart colour or occasionally other effects such as texture or sheen. Such use of tinters is known as "tinting".

Tinters may be organic solvent-borne or aqueous. Current commercially available aqueous tinters comprise solid particles of pigment dispersed in a dispersant system which comprises water and one or more water-miscible other ingredients at least one of which is a "non-volatile micellising dispersant". "Non-volatile" means having a vapour pressure of below $1.3N/m^2$ (and preferably below $1.0N/m^2$) at 25° C. A "dispersant" means a compound having moieties which adsorb onto the surfaces of the pigment particles and also moieties which are hydrophilic and which tend to position themselves with the water. "Micellising" means that as the concentration of the dispersant in water increases, it forms micelles of the type described on pages 305 to 327 of the book "Surfaces, Interfaces and Colloids" by D Myers, published in 1991 by VCH Publishers Inc of New York. In particular, surface tension studies show that "micellising dispersants" exhibit a "Critical Micelle Concentration" (CMC) as described on page 308 of Myers' book.

The presence of the absorbable moieties and hydrophilic moieties in the dispersant and its overall micellising character enable the dispersant to assist in serving several purposes including:

a. the breakdown of the dry agglomerates of pigment particles usually found in pigment as obtained from pigment manufacturers and which breakdown is achieved during the initial milling operations by which the tinter is formed, b. the facilitation of the uniform dispersion of the pigment particles in the dispersant during the initial mixing operations and c. the stabilisation of the dispersion once formed (with or without the assistance of a dispersant-promoter) so inhibiting flocculation and precipitation of the pigment particles even when the tinter is subsequently mixed into paint or the like.

It is particularly important that the dispersant be micellising for the use of non-micellising liquids would cause the re-agglomeration of the pigment particles into large balls as soon as they have been wetted by the liquid. The micellising dispersant should also increase the viscosity of the tinter to allow it to be pumped and metered accurately. However, large amounts of dispersants are avoided because they lead to an excessive increase in viscosity which then prevents accurate metering of the tinter and its efficient mixing into paint or the like.

Tinting may be performed by skilled operators under carefully controlled ambient conditions in a factory or it may be done by relatively unskilled people under less easily controllable ambient conditions found in retail shops or in trade stores, that is to say stores supplying paint to professional painters. Tinting (especially so-called "in-store" tinting done in retail shops or trade stores) generally involves the use of a tinter-dispenser fitted with dispensing nozzles each comprising a narrow bore (for example 1 to 4 mm diameter) from which fluid tinter is delivered into the paint. In-store tinting enables a shop or store to offer a large number of different colours or other effects, without having to stock more than at most a few different types of neutral base paints so saving on expensive warehouse space. Unfortunately tinting has the significant disadvantage that when dispensers are not in fairly frequent use or where ambient conditions are allowed to reach extremes of warmth and dryness, then any undelivered tinter left in the narrow bore delivery nozzle dries forming a cake which blocks the nozzle even when the tinter composition is non-film-forming.

Current commercially available aqueous tinters solve the nozzle blocking problem by including ethylene glycol in the dispersant system. Ethylene glycol is a humectants, that is to say it has a positive attraction for water and is less volatile than water at, say, 25° C. and 1 bar. Therefore it helps to retain water in the tinter composition which in turn means that it helps to retain the fluidity of the tinter so reducing the risk of nozzle blocking. The use of ethylene glycol with water in this way was disclosed in 1961 in British Patent Specification GB 861 223 and again in 1982 in European Patent Specification EP 0 049 785A. EP 0 049 785A also discloses other moderately volatile low molecular weight water-miscible organic liquids as alternatives to ethylene glycol and these are di-and triethylene glycols, mono, di- and tripropylene glycols and glycerol.

Ethylene glycol performs well as a humectant in aqueous tinter compositions but it is moderately volatile having a vapour pressure substantially above $1.3N/m^2$ at 25° C. Like all volatile and moderately volatile organic liquids, ethylene glycol now attracts environmental disapproval with the result that regulatory authorities are beginning to call for its removal from paints. Furthermore, ethylene glycol is possibly toxic and teratogenic. When less volatile alternatives to ethylene glycol such as dipropylene glycol or glycerol are used in tinter compositions for paints or the like, they are found to harm the water-resistance of the dried coats of paints so making them unsuitable for use on outdoor surfaces. Propylene glycol and the water-soluble poly (propylene glycols) such as dipropylene glycol also have odours which are too strong to be acceptable by modern standards.

An object of this invention is to provide an aqueous non-blocking tinter for paints or similar coating compositions which avoids the use of ethylene glycol or alternative moderately volatile low molecular weight water-miscible organic liquids such as dipropylene glycol yet which tinter (in reasonable commercial use) does not block the narrow bore delivery nozzles of conventional tinter-dispensers.

Accordingly this invention provides an aqueous non-blocking tinter for paints or similar coating compositions which tinter has a viscosity at 20° C. of from 0.05 to 1.5 $Ns/m^2$ (i.e. 0.5 to 15 poise and preferably to 1 to 12 poise)

and contains solid particles of pigment dispersed in a dispersant system which comprises a mixture of water and a water-miscible non-volatile micellising dispersant having hydrophilic moieties and moieties (usually less hydrophilic than the hydrophobic moieties) capable of adsorbing onto the surface of the pigment wherein a) the dispersant system also comprises a minor amount (less than 50 wt % and preferably less than 30 wt % based on the weight of the dispersant system) of non-volatile macromolecular non-micellising auxiliary material having a weight average molecular weight of from 230 (preferably 250) to 4500 and being selected from:
  i) liquids miscible with the mixture of water and non-volatile dispersant and/or
  ii) organic solids of melting point below 150° C. which are dissolved or dispersed in the system,
b) for a selected weight of pigment, the ratio by weight of non-volatile micellising dispersant to pigment is at least 5% (and preferably 15%) greater than the ratio by weight of non-volatile micellising dispersant to pigment which would be present at the Daniel Flow Point of a notional tinter consisting only of the same pigment, water and the same non-volatile micellising dispersant,
c) the fluidity of the tinter is such that after the non-blocking tinter has been stored at 25° C. in a cylindrical bore 2 mm in diameter and 15 mm in length in an ambient relative humidity of 50% for 18 hours, a pressure of not more than 320 MN/m$^2$ is sufficient to cause the residual tinter to flow from the bore and
d) "non-volatile" means having a vapour pressure of below 1.3N/m$^2$ (and preferably below 1.0N/m$^2$) at 25° C.

Preferably the dispersant system comprises at least 70 wt % of water.

When the weight ratio of non-volatile micellising dispersant to pigment is at least 5% in excess of that found at the Daniel Flow Point of the notional tinter, it is believed that associative structures are created involving pigment and dispersant. It appears that these structures can be used to overcome the blocking problem posed by residual tinters provided that the correct excess ratio of dispersant to pigment is chosen and provided the dispersant is used in combination with the correct amount of non-micellising auxiliary material. A further problem is that the "correct" excess ratios of non-volatile micellising dispersant to pigment and the "correct" amounts of auxiliary material may vary unpredictably with the nature of the pigment, dispersant and auxiliary material but it was discovered that the pressure needed to cause the residual tinter to flow from the 2 by 15 mm bore after 18 h at 25° C. and relative humidity 50% provided a reliable criterion for identifying tinters comprising these "correct" amounts. It was the discovery of this criterion which made it practicable to devise non-blocking formulations using excess ratios of dispersant to pigment in combination with the auxiliary material.

"Daniel Flow Point" is a well known characteristic of pigment dispersions and it is discussed for example in Chapter 8 of the book "Paint and Surface Coatings: Theory and Practice" edited by R Lambourne and published in 1987 by Ellis Horwood of Chichester, England see particularly page 312. Essentially Daniel Flow Point is a measure of the minimum amount of dispersant needed to cover completely (i.e. to wet completely) the surfaces of the pigment particles in the dispersion.

Dispersant systems which can be used in this invention may contain the currently used promoted or unpromoted dispersants. A promoted dispersant is a water-miscible anionic micellising surfactant which requires the presence in the dispersant system of a so-called non-ionic "dispersant-promoter" without which the micellising surfactant does not give a fully useful dispersion. In particular, when used with some pigments, the unpromoted dispersant fails to maintain the pigment in a dispersed state when the dispersion is mixed into a paint or the like. Conventional anionic micellising surfactants include amine and metal salts of alkyl and aryl sulphonates or phosphates many of which are mentioned in GB 861 223. Conventional dispersant-promoters are water-miscible non-ionic micellising surfactants which usually do not give a clearly discernable Daniel Flow Point with the pigment. $C_8$ to $C_{14}$ alkyl phenyl ethoxylates are typical dispersant-promoters of which octyl or nonyl phenol ethoxylates as illustrated below are the most commonly used.

Promoters are micellising but if used alone they produce little if any Daniel Flow Point Minimum.

Alkyl phenol ethoxylates bio-degrade to give phenolic products now regarded as pollutants possibly toxic to fish and so their use is likely to be restricted soon. Therefore an alternative object of this invention is to provide an aqueous non-blocking tinter which also avoids the use of alkyl phenol ethoxylates.

Accordingly this invention also provides an aqueous non-blocking tinter wherein the dispersant system contains a water-miscible non-volatile long chain micellising dispersant which comprises at least one macromolecular essentially non-ionic composition comprising a) relatively long chain hydrophobic moiety having a chain length of at least 10 and preferably not more than 40 carbon atoms and which is capable of absorbing onto the surfaces of the pigment particles,
b) relatively long chain hydrophilic moiety having an average chain length of from 20 to 250 atoms and which enables the pigment to be dispersed in the carrier vehicle and which inhibits de-stabilisation when the tinter is mixed into paint or the like and
c) optionally some anionic character if the composition has been made by a process involving the esterification of carboxylic acid groups and the esterification has not gone to completion leaving the mainly non-ionic composition with an acid value of possibly up to 10 mg KOH/g of the composition.

A first type of such long chain dispersants comprises a mono- or diester or mixture of mono- or diesters obtainable by esterifying an aliphatic long chain mono- or dicarboxylic acid with long chain hydrophilic alcohols, preferably poly (alkylene glycol). The alkylene group is usually ethylene, a mixture of ethylene and propylene or possibly blocks of two or more poly(propylene glycol) and poly(ethylene glycol) moieties linked together directly or via a divalent intermediate group such as the diamino group. A diester version of this first type of long chain dispersant has the approximate formula where XXXX represents the long chain hydrophilic poly (alkylene glycol) moiety. The carboxylate moiety preferably comprises a carbon chain of from 14 to 40 carbon atoms and the average number of alkylene oxy units in the hydrophilic chain is from 7 to 70. If the average falls below 7, the pigment dispersion becomes vulnerable to flocculation in the presence of the high concentrations of electrolyte which are found in many paints. If the average exceeds 70 or if the number of carbon atoms in the carboxylate carbon chain exceeds around 40, the dispersant becomes poorly water-miscible. If the number of carbon atoms in the carbon chain falls below 10, the dispersant is unlikely to adsorb onto the pigment surfaces. The most preferred hydrophilic moieties are poly(ethylene glycol) chains having weight average molecular weights of from 350 to 2500. The most preferred carboxylate moieties are those deriveable by hydrolysing one or more natural fatty oils to obtain the corresponding acids (which are usually mixtures of fatty acids containing 18 carbon atoms and at least one carbon to carbon double bond although some fully saturated acid may also be present) and then using the acids to produce the required esters by esterifying one or both ends of the poly(alkylene glycol) chain. Suitable fatty oils include castor, coconut, cotton seed, linseed, oticica, perilla, rubber seed, safflower, sunflower, soya bean, tung oil and in particular tall oil which hydrolyses to give a mixture of acids usually containing around 45 wt % oleic acid, 48 wt % linoleic acid and 7 wt % miscellaneous saturated acids. The other fatty acids commonly available from fatty oils are ricinoleic, linolenic, eleostearic and licanic acids.

A second type of long chain dispersant comprises one or more long chain hydrophilic preferably poly(alkylene glycol) moieties dependent from a long chain hydrophobic backbone copolymer which backbone copolymer comprises addition copolymerised hydrophobic co-monomers. A typical example of this second type of long chain dispersant would have the approximate formula where the X's again represent long chain hydrophylic poly(alkylene glycol) moiety. The alkylene group is again usually ethylene, mixtures of ethylene or propylene or more or linked blocks and the chain comprises 7 to 70 alkylene glycol units for the reasons explained above. Preferably one end of the poly(alkylene glycol) chain is terminated by an alkoxy group (usually methoxy) whilst the other end is attached to the backbone copolymer via an ester group. For example this other end may form an ester with an addition-copolymerisable unsaturated carboxylic acid and then the ester is introduced into the addition copolymerisation reaction which forms the backbone copolymer so that the esterified acid becomes part of the backbone copolymer whilst the poly(alkylene glycol) esterifying moiety becomes a side chain dependent from the backbone. The preferred unsaturated carboxylic acids are acrylic, methacrylic, crotonic and itaconic with methacrylic being most preferred. This second type of long chain dispersant preferably has a weight average molecular weight of from 6,000 to 50,000 and most preferably from 6,000 to 15,000 as determined by the light scattering techniques.

Sometimes particular shades of colour require the mixing of tinters containing pigments having widely different surface characteristics. For example one tinter may contain a pigment having a hydrophobic surface whilst the other tinter might contain a pigment having a hydrophilic surface. Pigments of widely different surface types often require correspondingly different dispersants in order to form a tinter and when such different tinters are mixed, there is a risk of de-stabilisation of at least one of the tinter-dispersions owing to competitive desorption of a dispersant from one pigment and its possible re-adsorption onto another. Hence, it is clearly desirable to use a tinter comprising a dispersant which can stabilise a wide range of pigments of different surface types. Therefore it is an object of a refinement of this invention to provide such a tinter.

Accordingly a refinement of this invention provides an aqueous non-blocking tinter comprising a more universal water-miscible long chain non-volatile micellising dispersant which is a macromolecular anionic compound containing one or more long chain hydrophilic poly(alkylene glycol) moieties dependent from a long chain hydrophobic backbone copolymer which backbone copolymer comprises addition copolymerised hydrophobic co-monomers wherein the backbone copolymer also comprises a) dependent hydrophobic groups chosen from aromatic groups and/or long chain aliphatic groups containing a chain of at least 14 carbon atoms and b) dependent hydrophilic groups chosen from acid groups and/or groups containing hydroxyl.

A typical more universal long chain dispersant containing dependent aromatic groups might have the formula where the X's again represent long chain hydrophilic moiety.

The dependent hydrophobic groups enhance the ability of the hydrophobic backbone copolymer chain to adsorb onto hydrophobic pigment surfaces whilst the acid and hydroxyl groups enhance its ability to adsorb onto hydrophilic pigment surfaces probably by means of ionic or hydrogen bonding. The long chain hydrophilic poly(alkylene glycol) moieties serve as before to enable the pigment particles to form a stable dispersion in the aqueous carrier vehicle. The result is that even without the help of a dispersant promoter, the more universal dispersant can achieve stable dispersions of the majority of commercially available pigments in aqueous carrier vehicles irrespective of their affinity for water, that is to say irrespective of whether they are hydrophobic, neutral or hydrophilic.

The long chain hydrophilic poly(alkylene glycol) moieties in the more universal dispersant preferably comprise as before poly(ethylene glycol) and/or poly(ethylene propylene glycol) moieties containing 7 to 70 alkylene glycol units and having a weight average molecular weight of from 300 to 3100. As before, the hydrophilic moiety may comprise two or more poly(alkylene glycol) chains joined by a linking group such as an amine group.

Preferably the dependant hydrophobic groups in the more universal dispersant are provided by copolymerising into the backbone copolymer, co-monomers such as styrene or vinyl toluene each optionally substituted with alkyl (preferably methyl) groups or halogen (preferably chloro or fluoro groups) and/or long chain esters of unsaturated carboxylic acids such as the lauryl or stearyl esters of acrylic or methacrylic acids. Likewise, the dependent hydrophilic groups in the more universal dispersant are preferably provided by copolymerising unsaturated acids such as acrylic, methacrylic, crotonic, itaconic, maleic (as its anhydride), vinyl sulphonic or vinyl phosphonic acids or unsaturated compounds containing hydroxyl groups such as hydroxy esters usually hydroxyalkyl esters preferably containing one to six carbons and including hydroxyethyl acrylate or methacrylate and most preferably hydroxyisopropylmethacrylate which has been found to offer a very useful combination of both hydrophilic and hydrophobic characteristics.

The weight average molecular weight (as determined by light scattering) of the more universal dispersant is preferably from 2500 to 20000 and most preferably at least 6000 and preferably not more than 12000. The long chain hydrophobic backbone usually comprises from 5 to 30 wt % (preferably 15 to 30 wt %) of the dispersant where "long chain hydrophobic backbone" means all of the dispersant except for dependent hydrophilic poly(alkylene) glycol moieties, dependent hydrophobic groups, dependent hydrophilic groups and groups such as metal or nitrogen-containing ions which are bonded to one or more dependent moieties or groups. Preferably the dependent moieties and groups are present in the more universal dispersant in the following weight percentages which are based on the total weight of the copolymer:

| | |
|---|---|
| Long chain poly(alkylene glycol) moieties: | 50 to 80 wt % |
| Hydrophobic groups: | 6 to 36 wt % |
| Acidic Hydrophilic groups: | 4 to 10 wt % |
| Hydroxy Hydrophilic groups: | 4 to 10 wt % |

Preferably any acid groups dependent from the backbone are partially neutralised by monovalent cations such as nitrogen-containing groups or most preferably Group 1 metal ions, preferably sodium ions. Preferably from 60 to 80% of the acid groups are neutralised. The hydrophobic/hydrophilic balance of the backbone copolymer can be adjusted if necessary by including among the copolymerising some co-monomers copolymerised short chain ($C_1$ to $C_8$) alkyl esters of addition copolymerisable unsaturated acids to increase hydrophobicity or some extra hydroxy ester or alternatively some amides of addition copolymerisable unsaturated acids to increase hydrophilicity. Typical short alkyl chain esters include methyl, ethyl, butyl and ethylhexyl esters of acrylic, methacrylic, crotonic or itaconic acids whilst methacrylamide is a typical amide.

The tinter carrier vehicle also comprises the non-volatile macromolecular non-micellising auxiliary material which is preferably a liquid miscible with the mixture of water and dispersant but which may also be a solid provided that the solid has a melting point of below 150° C. and is soluble or dispersible in the mixture of water and dispersant. It is important that the auxiliary material should be non-micellising, that is to say its solutions or dispersions in water should show no Critical Micelle Concentration. The auxiliary material serves to modify the effects produced in the tinter arising from the greater ratio of dispersant to pigment over that found at the Daniel Flow Point. In particular it enables the residual tinter to meet the narrow bore flow criterion.

The non-micellising auxiliary material should be compatible with the dispersant when both are together in the dispersant system and for this reason water-soluble or water dispersible poly(alkylene glycol) compounds are preferred as the auxiliaries for use with the preferred long chain dispersants. The poly(alkylene glycol) chains may be terminated by alkoxy(usually methoxy) groups. As before, the usual alkylene groups are either propylene or more preferably ethylene but for the auxiliary material, the poly (alkylene glycol) chains can contain on average from 4 to 100 alkylene glycol units. The higher molecular weight poly (alkylene glycols) tend to be solids at room temperature and so for ease of handling prior to their dispersion into the dispersant system, it is preferred to choose lower molecular weight poly (alkylene glycols). Alternative non-micellising solid auxiliaries include emulsions of particles of waxes of the types usually used as additives in paints. The brochure "Product Guide XI 1" published in 1991 by BYK Cera of Deventer in the Netherlands describes such waxes. Especially useful are particulate low density polyethylene waxes in which the polyethylene has a weight average molecular weight of from 500 to 3000. Preferably other waxes should have a similar molecular weight average. Particularly useful results are obtained if the particulate waxes are used in combination with non-solid auxiliary materials. It is usually the case that the solid auxiliary materials are permanently deformable by a pressure of not more than 320 $MN/m^2$, that is to say if a particle of the solid is subjected to a pressure which does not exceed 320 $MN/m^2$, that pressure will nevertheless be sufficient to deform the shape of the particle to an extent where the original shape is not recovered. Waxes are particularly good examples of solids which are permanently deformable in this way.

This invention may be used with both organic and inorganic pigments such as phthalocyanines, azos and quinacridones or carbon blacks, titanium dioxides and iron oxides. Pigment particle sizes may vary from quinacridones or carbon blacks, titanium dioxides and iron oxides. Pigment particle sizes may vary from 10 nm to 50 $\mu$m (microns) and pigment surface areas may vary from 12 $m^2/g$ to 100 $m^2/g$. The weight percentage of pigment in a tinter for example varies from 10 to 75 wt % depending on the strength of tinter required. Where a tinter is deliberately required to have a low strength (for example where only slightly off-white shades are wanted), there may be an insufficient number of pigment particles to enable the dispersing agent to generate enough structure. In such circumstances, it is usual to add extra neutral solid particles to the tinter and these neutral particles are often referred to as "extender" particles. For the purposes of this invention, any necessary extender particles will be considered to be pigment particles. Typical extenders include clays, chalks, talcs, barytes and silicas.

Where tinter-dispensers are especially exposed to severe drying conditions, then it is preferred that the tinters be formulated to contain less than their critical volume of pigment particles, that is to say the amount of carrier vehicle present in the tinter should be more than the minimum which would be needed to fully fill all the interstices between fully contiguous pigment particles. This ensures that the tinter will be virtually permanently non-blocking but at the cost of having reduced tinting strength.

Tinters containing large amounts of auxiliary material may impart undue water-sensitivity to the ultimate coat of dried paint or the like. For this reason it is preferred that the tinter should comprise less than 30 wt % of the auxiliary. Usually up to 15 wt % is sufficient.

The invention is further illustrated by the following Examples of which Examples A to E are comparative.

Various procedures described below were used in performing the Examples and two of the procedures refer to the drawings:

Figure 2:
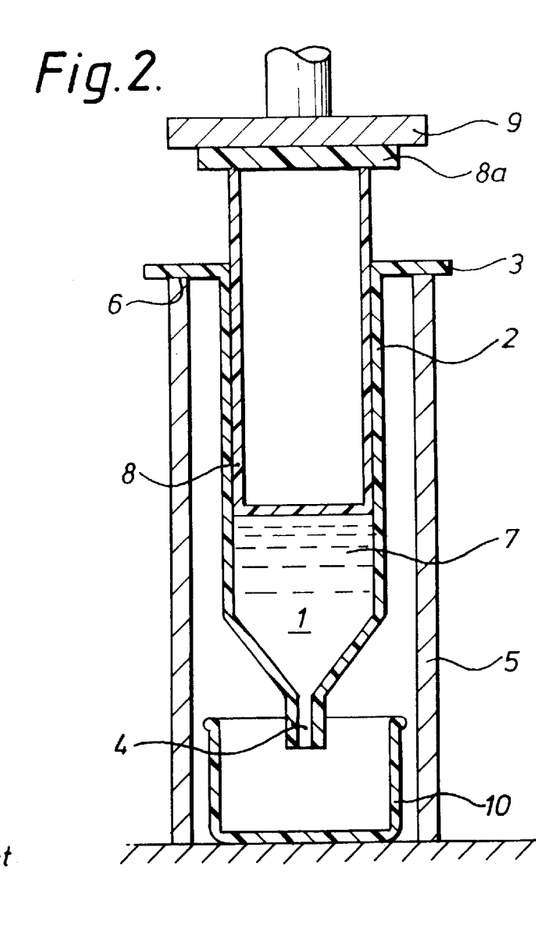
FIG. 2 shows the apparatus used in the Cylindrical Bore Test.

The various procedures are as follows:

Cylindrical Bore Test for assessing Narrow Bore Flow:

The cylindrical bore test is performed using the apparatus shown in FIG. 2 and at a temperature of 25° C.

FIG. 2 shows a syringe 1 comprising a chamber 2 one end of which terminates in an outwardly extending circular flange 3 whilst the other end terminates in a narrow cylindrical bore 4 of length 15 mm and diameter 2 mm. Syringe 1 is supported within a vertical metal tube 5 by means of its flange 3 resting on top edge 6 of tube 5 with the result that bore 4 is located vertically below chamber 2. Tinter (which will have a structure arising from the interaction between dispersant and pigment) is accommodated in chamber 2 and is prevented from escaping via bore 4 initially by its structure and later by increasing internal cohesive forces generated as water is lost by evaporation.

Syringe 1 also comprises a piston 8 inserted into chamber 2 until it contacts tinter 7. The top of piston 8 terminates in a disc 8a of diameter 45 mm which contacts loading platten 9 of an "Instron" 1000 loader. The loader has the ability to exert a variable but measurable pressure onto piston 8. On loading piston 8 sufficiently to overcome (where possible) the forces retaining the tinter within chamber 2, piston 8 descends forcing tinter out through narrow cylindrical bore 4 into a receptacle 10 placed below bore 4.

The "Instron" 1000 loader is available from the Instron Corporation of Canton, Mass., USA.

To perform the Cylindrical Bore Test, the tinter is first de-aerated by centrifuging under vacuum to remove any trapped air bubbles. 30 mls of de-aerated tinter are drawn into syringe 1 via its nozzle 4 by raising piston 8. The syringe is then stored vertically at 25° C. with its nozzle pointing downwards for specified periods of time under an ambient relative humidity of 50%. On completing storage for the specified period of time, the syringe is placed in tube 5 and subjected to steadily increasing pressure from the loader. The pressure needed to overcome the forces retaining the tinter in the syringe is noted. A tinter is only considered to be non-blocking if after 18 h of storage at 25° C. and relative humidity 50%, the pressure needed is below 320 $MN/m^2$.

Determination of Daniel Flow Point:

This procedure provides the Daniel Flow Point or a tinter consisting of a chosen pigment, water and a chosen dispersing agent. The procedure is performed at 25° C.

10 g of the particulate pigment are weighed into a 100 ml beaker. 1 ml of a mixture consisting of 5 wt % of the dispersing agent in water is added to the beaker and the contents of the beaker are stirred and kneaded together using a stiff bladed palette knife to obtain the best possible mixing of particles and mixture. Further additions of 1 ml of the mixture are added each followed by similar stirring and kneading until the majority of particles start to show signs of sticking together. Then the mixture is added in increments of 0.5 ml each followed by similar stirring and kneading until just sufficient mixture has been added to cause the contents to form a coherent ball of pigment and mixture. Finally further mixture is added in smaller increments of from 0.1 ml to 0.4 ml each followed by similar stirring and kneading until just enough mixture has been added to form a free-flowing paste. A "free-flowing paste" is a paste which will flow from a flat surface inclined at an angle of 45° leaving only a thin even film of pigment and mixture on the flat surface.

Figure 1:
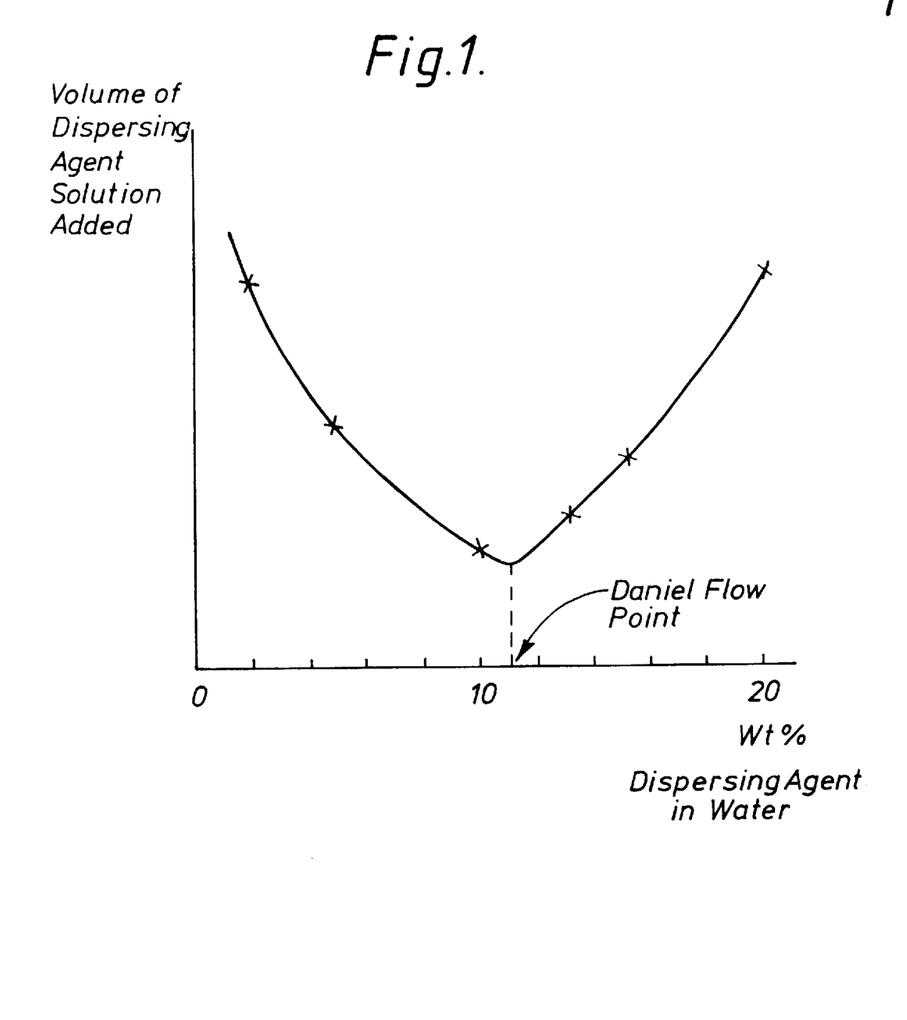
FIG. 1 shows a graph illustrating the occurrence of a Daniel Flow Point.

The entire procedure is repeated five times using respectively solutions consisting of 2 wt %, 10 wt %, 13 wt %, 15 wt % and 20 wt % dispersing agent in water. A graph as indicated in FIG. 1 of the drawings is plotted showing each volume of solution added to arrive at the free-flowing paste versus the weight percentage of dispersing agent in the solution. The minimum point on this graph is defined to be the "Daniel Flow Point" of the pigment in an aqueous solution of the dispersing agent.

Melting Point Determination:

The melting point of the solid auxiliary materials is determined by the ring and ball technique described in ASTM Test E28-67 (1977) which refers to the melting point more accurately as a softening point.

Scrub Resistance Determination:

10 parts by weight of tinter were thoroughly mixed into 90 parts by weight of a commercial aqueous base paint to produce a tinted paint. The paint comprised 16.6 wt % film-forming methacrylate based copolymer, 35.8 wt % solids other than film-forming copolymer and 47.6 wt % water containing a conventional anionic dispersant system. The paint is available from ICI Paints of Slough, England as "Dulux" Vinyl Matt trade deep base paint.

The smooth face of a flat sheet of hardboard 300 mm by 150 mm was scuffed using standard 3M's "Trimite" 320 abrasive paper. The scuffed surface was wiped clean with a damp rag. The tinted paint under test was applied to the dry scuffed surface using a block applicator spaced 200 $\mu$m from the surface. The painted surface was allowed to dry and age for 7 days at ambient temperature. The aged panel was cut into four equal rectangles and the scrub resistance of the painted surface of each rectangle was determined as follows:

A felt pad was mounted on a stem which in turn was mounted off-centre in a rotary drive so that operation of the drive caused the pad to sweep out eccentrically a circular area of 300 $mm^2$. The pad was moistened with water containing 0.5 wt % of a surfactant which was "Synperonic" N available from ICI Surfactants of Wilton in Cleveland, England. The pad was kept moist throughout the test by adding more of the water containing Synperonic" N. The pad was loaded with a 1 kg weight and was caused to rotate against the painted surface until the hardboard surface was exposed. The number of rotations needed to expose the surface was counted.

Measurements were made on all four rectangles and then the whole procedure was repeated so producing 8 results in total. The average of these eight results was reported as the scrub resistance of the paint.

Weight Average Molecular Weights by Chromatography

Unless light scattering is specified, weight average molecular weight was determined by chromatography. The determination was performed by making a solution consisting of 0.5 wt % polymer in 99.5 wt % tetrahydrofuran and subjecting the solution to gel permeation chromatography using a pair of 300 mm linear columns arranged in series and packed with 5 micron polystyrene gel supplied by Polymer Laboratories Ltd of Church Stretton, England. The results obtained are calibrated against a polystyrene standard.

Weight Average Molecular Weight of Dispersants by Light Scattering:

Where the weight average molecular weight of a dispersant was determined by light-scattering, the determination was performed on a solution of the dispersant in methyl ethyl ketone at 25° C. using an Otsuca DLS 700 Multiangle Light Scatterer available from Polymer Laboratories Ltd of Church Stretton in England. The light source is a helium/neon laser and light is collected over an angle of 60° to 120°.

Viscosity Determination:

The viscosity of the tinter at 20° C. is measured using a Sheen/ICI "Rotothinner" according to the procedure described in the brochure called "Sheen/ICI Rotothinners" available from Sheen Instruments Limited of Teddington, England. The contents of this brochure are herein incorporated by reference. The brochure specifies that the rotor turn with a speed of 575 rpm which usually generates a shear of around 300/sec.

COMPARATIVE EXAMPLES A AND B AND EXAMPLE 1

Illustration of the Need for an Auxiliary Component to enable a tinter to be Non-Blocking and the Use of Promoted Anionic Surfactant:

For the purposes of Comparative Example A, a "notional" aqueous tinter was made up by mixing 44.5 wt % of a hydrophobic organic blue pigment of number average particle size 0.78 $\mu$m, together with 46.2 wt % water, 6.6 wt % of a dispersant system consisting of a proprietary mixture of a conventional water-miscible anionic micellising surfactant with a conventional dispersant promoter which was a nonyl phenol ethoxylate and 2.7 wt % of a conventional aqueous biocidal solution. The weight ratio of dispersant to pigment was approximately 40% greater than that present at the Daniel Flow Point. The pigment volume content of the tinter was 75% which is above the critical pigment volume concentration.

Mixing was initially performed at 25° C. using a stiff bladed pallette knife for about 3 minutes and then was completed by three consecutive passes at 35° C. through a Mini-Eiger bead mill operating at 3,000 rpm. Samples of the fully mixed tinter were then subjected to the Cylindrical Bore Test and it was found that the tinter lost water and ceased to be non-blocking after a storing period of only 6 hours. Accordingly, Comparative Example A shows that in the absence of an auxiliary material, the tinter soon loses water and ceases to be non-blocking.

For the purposes of Comparative Example B, the procedure of Comparative Example A was repeated except that 8 wt % of the water was replaced by 8 wt % of ethylene glycol which served as a non-micellising volatile auxiliary material. The tinter was subjected to the cylindrical bore test and was found to be still non-blocking even after a drying period of 18 hours although it became fully blocking after a drying period of somewhere between 18 and 63 hours. Accordingly, Comparative Example B confirms that ethylene glycol would be a suitable non-micellising auxiliary material were it not for its volatility and possible toxicity.

For the purpose of Example 1, the procedure of Comparative Example B was repeated but the 8 wt % of ethylene glycol used was instead replaced by 8 wt % of a water-soluble poly (ethylene glycol) of weight average molecular weight 800 and melting point 28° C. The poly (ethylene glycol) was non-micellising in the aqueous solution and so served as a non-volatile macromolecular non-micellising water-soluble auxiliary material. The tinter was found to be non-blocking even after a storing period of 63 hours and so the poly (ethylene glycol) was an adequate replacement for ethylene glycol. In fact, it performed much better probably because it remains as a soft low melting solid if all the water is lost from the tinter.

In all of the above Examples, the viscosity of the tinter prior to drying was 0.5 Ns/m$^2$.

EXAMPLES 2 TO 7

The Use of Unpromoted Long Chain Dispersants:

Tinters were made up by mixing together 65.2 wt % of a hydrophilic inorganic pigment, 20.5 wt % of water, 3.5 wt % of a water-soluble, non-volatile micellising long chain dispersant and 10.8 wt % of a water-soluble non-volatile non-micellising auxiliary material. The weight ratio of dispersant to pigment was over 15% greater than that present at the notional Daniel Flow Point and the concentration of pigment exceeded its critical pigment volume. In the case of Example 2, the pigment was a red iron oxide of particle size 0.9 $\mu$m available as "Bayferrox" 105M from Bayer Plc of Newbury, England, and in the case of Examples 3 to 7 the pigment was the hydrophobic organic blue as used in Comparative Example A.

The dispersant used in Examples 2 to 5 was of the "more universal" type and consisted of a 75% sodium ion neutralised backbone copolymer containing copolymerised styrene (16 wt %), methacrylic acid (10 or 4 wt %), hydroxyisopropyl methacrylate (4 or 10 wt %) and a methoxypolyethylene glycol methacrylate (70 wt %) in which the weight average molecular weight of the methoxypolyethylene glycol moiety was 2000. The precise amounts of acid and hydroxy monomers present are specified in Table 1. The methacrylate group of the methoxypolyethylene glycol methacrylate forms part of the backbone copolymer so that the poly(ethylene glycol) moieties are present as hydrophilic side chains pendant from the backbone. The average number of ethylene glycol (ethoxy) units in the side chains is either 40 or 17 again as specified in Table 1. The weight average molecular weight of the dispersant was 10,000 as determined by light scattering. The dispersant used in Example 6 was an alkoxy poly(ethylene glycol) in which the alkoxy group contains six ethylene glycol units. The dispersant is available as "Synperonic" 91/6 from ICI Surfactants of Wilton in Cleveland, England. The dispersant used in Example 7 was a proprietary naphthoxy poly(ethylene glycol) in which the number of ethylene glycol units in the poly (ethylene glycol) chain is unknown.

The water-soluble non-volatile non-micellising auxiliary material used was a poly(ethylene glycol) containing an average of 9 ethylene glycol units and having a melting point of 5° C. It therefore remains a liquid in the absence of water at room temperatures.

As in Comparative Example A, the tinters were made up by first mixing ingredients together at 20° C. using a stiff bladed pallette knife for about 3 minutes followed by three consecutive passes at 35° C. through the Mini Eiger bead mill rotating at 3,000 rpm. Samples of the tinters were subjected to the 18 hour Cylindrical Bore Test and the pressure needed to cause the tinter to flow through the bore was measured. The results obtained are shown in Table 1, together with the viscosities of the tinters prior to storing.

TABLE 1

| Example | Pigment | Dispersant | *MAA wt % | *HiPMA wt % | **PEG Chain Length | Viscosity Ns/m² | Pressure MN/m² |
|---|---|---|---|---|---|---|---|
| 2 | Red | ***Sty/MAA/HiPMA/PEG | 10 | 4 | 40 | 0.65 | 31.8 |
| 3 | Blue | " | 10 | 4 | 40 | 0.70 | 157 |
| 4 | Blue | " | 4 | 10 | 17 | 0.45 | 126 |
| 5 | Blue | " | 10 | 4 | 6 | 0.60 | 220 |
| 6 | Blue | C₉alkoxy PEG | — | — | 6 | 0.15 | 80 |
| 7 | Blue | Naphthoxy PEG | — | — | 10 | 0.20 | 116 |
| 8 | Yellow | Sty/MAA/HiPMA/PEG | 4 | 10 | 40 | 0.29 | 231 |
| 9 | Yellow | ***Isobut.MAh.Na | — | — | — | 0.46 | 208 |
| 10 | Yellow | As 9 + Promoter | — | — | — | 0.65 | 252 |
| C | Yellow | None | — | — | — | Undispersable | |

*Methacrylic Acid
*Hydroxyisopropyl methacrylate.
**No of ethylene glycol units in the poly(ethylene glycol) chain in the dispersant.
***Styrene/Methcrylic Acid/Hydroxyisopropyl methacrylate/Methoxy PEGMA copolymer where Methoxy PEGMA is Methoxy poly(ethylene glycol) methacrylate.
***Isobut.MAh.Na is the sodium salt of the isobutylene/maleic anhydride copolymer.

EXAMPLES 8 to 10
Further Long Chain Dispersants:

Tinters were made up by mixing together 55 wt % of a hydrophilic yellow inorganic pigment, 27.4 wt % water, 7.0 wt % of a water-soluble non-volatile micellising long chain dispersant and 10.6 wt % of the auxiliary material used in Examples 2 to 7. Again the ratio of dispersant to pigment was more than 15 wt % greater than that at the notional Daniel Flow Point and the concentration of pigment was above the critical pigment volume concentration. The pigment was a yellow iron oxide of acicular particle size 0.1 by 0.4 μm and available as "Bayferrox" 3910 from Bayer Plc of Newbury, England. The dispersant used in Example 8 was non-ionic and was the same as that used in Example 4. The dispersant used in Example 9 was anionic and was the sodium salt of an isobutylene maleic anhydride copolymer. The dispersant of Example 9 was also used in Example 10 except that 1 wt % of the dispersant was replaced by 1 wt % of poly(ethylene glycol) sorbitol monolaurate which served as a dispersant-promoter.

The tinters were made by first stirring the liquid ingredients together at 20° C. in a one litre vessel using a 40 mm blade fitted into a high speed dispenser operating at a low speed of 1000 rpm. The pigment particles were gradually added to the slowly stirring mixture over a period of about 5 minutes and then the disperser was switched to its high speed of 5000 rpm. High speed dispersion was continued for 30 minutes and then the dispersions obtained were each subjected to the 18 hour Cylindrical Bore Test. The results obtained are shown in Table 1 along with the viscosities of the tinters before storage.

COMPARATIVE EXAMPLE C
The need for a Micellising Dispersant:

An attempt was made to repeat Example 8 but with the 7 wt % of the micellising dispersant replaced by a further 7 wt % of the non-micellising auxiliary material. It was found impossible to form a dispersion of pigment in liquid. Instead, the pigment particles re-agglomerated into a large ball consisting of wet pigment particles held together by the wetting liquid. The ball was unaffected by further action of the high speed disperser and so no dispersion could be formed.

EXAMPLES 10 AND 11 AND COMPARATIVE EXAMPLE D
Alternative Non-Micellising Auxiliary Materials and the Need for a Non-Micellising Auxiliary Material:

The procedure of Example 8 was repeated except that the auxiliary material was replaced by either triglycerol in Example 10 or dextrin in Example 11. Triglycerol has a molecular weight of 240 and is non-micellising in that it shows no Critical Micellisation Concentration when dissolved in water. The dextrin used in Example 11 was likewise non-micellising showing no Critical Micellisation Concentration. Again, the dispersant to pigment ratio was above 15 wt % more than that at the notional Daniel Flow Point and the pigment concentration was, above the critical pigment volume concentration.

The tinters obtained were subjected to the Cylindrical Bore Test and the results obtained are shown in Table 2 along with the viscosity of the tinter before storage. The results from Example 8 are repeated in Table 2 for ease of comparison.

For the purposes of Comparative Example D, the procedure of Example 8 was repeated but with the 10.6 wt % of poly(ethylene glycol) auxiliary material replaced by 10.6 wt % of water. The tinter was subjected to the cylindrical bore test and it was found to have blocked the bore after 18 hours to such an extent that the maximum pressure available from the Instron loader was insufficient to unblock the bore. The viscosity of the tinter before storage is shown in Table 2.

TABLE 2

| Example | Auxiliary Material | Viscosity Ns/m² | Pressure MN/m² |
|---|---|---|---|
| 8 | Poly(ethylene glycol) | 0.29 | 231 |
| 10 | Triglycerol | 0.49 | 255 |
| 11 | Dextrin | 1.48 | 283 |
| D | none | 0.19 | >>320 |
| E | Glycerol | 0.32 | 230 |

COMPARATIVE EXAMPLE E
The Unsuitability of Low-Molecular Weight Non-Volatile Auxiliary Materials:

The procedure of Example 8 was repeated but using 10.6 wt % of glycerol (molecular weight 92) instead of the 10.6 wt % polyethylene glycol used in Example 8. Glycerol is non-volatile having a vapour pressure of below 1.3N/m² at 25° C. The tinter obtained had a viscosity of 0.32 Ns/m and required a pressure of only 230 MN/m to expel it from the bore when it was subjected to the 18 hour Cylindrical Bore Test. Accordingly the tinter was suitable for dispersing from the narrow bore nozzles of tinter-dispenser machines. However, when 10 wt % of the tinter was dispersed into the standard test paint used in the Scrub Resistance Test and dry coats of the paint were subjected to the Scrub Resistance Test, it was found that the scrub resistance of the paint was only 260 rotations as compared with 400 rotations for a tinter made according to Example 8. Therefore the use of the tinter containing the low molecular weight non-volatile glycerol as auxiliary material detracted significantly from the water-resistance of a dried coat of paint containing it.

We claim:

1. An aqueous non-blocking tinter for paints or similar coating compositions free of ethylene glycol and $C_8$ to $C_{14}$ alkyl phenyl ethoxylates, said tinter having a viscosity at 20° C. of from 0.05 to 1.5 $Ns/m^2$ and containing solid particles of pigment dispersed in a dispersant system which comprises a mixture of at least about 59 wt % of water based on the weight of the dispersant system, and a dispersant having hydrophilic moieties and moieties capable of absorbing onto the surface of the pigment wherein
   (a) the dispersant is water-miscible, micellising, has a vapour pressure of below 1.3$N/m^2$ at 25° C. and comprises at least one macromolecular essentially non-ionic composition comprising
      (1) relatively long chain hydrophobic moiety having a chain length of at least 10 carbon atoms and capable of absorbing onto the surfaces of the pigment particles,
      (2) relatively long chain hydrophilic moiety having an average chain length of from 20 to 250 atoms and
      (3) optionally some anionic character if the composition has been made by a process involving the esterification of carboxylic acid groups and the esterification has not gone to completion
   (b) the dispersant system also comprises a minor amount of less than 30 wt % of poly(ethylene glycol) having a weight average molecular weight of from 250 to 4,500 and
for a selected weight of pigment, the ratio of weight of water-miscible micellising dispersant to pigment is at least 5% greater than the ratio by weight of water-miscible micellising dispersant to pigment which would be present at the Daniel Flow Point of a notional tinter consisting only of the same pigment, water and the same water-miscible micellising dispersant but without component (b), the fluidity of said tinter being such that after the non-blocking tinter has been stored at 25° C. in a cylindrical bore 2 mm in diameter and 15 mm in length in an ambient relative humidity of 50% for 18 hours, a pressure of not more than 320 $MN/m^2$ is sufficient to cause the residual tinter to flow from the bore.

2. A tinter according to claim 1 wherein the dispersant comprises a mono- or diester composed of one or two aliphatic long chain hydrophobic carboxylate moieties and of long chain hydrophilic poly(alkylene glycol) moiety.

3. A tinter according to claim 2 wherein the alkylene group in the poly(alkylene glycol) is ethylene.

4. A tinter according to claim 2 wherein the dispersant comprises at least one long chain hydrophilic poly(alkylene glycol) moiety dependent from a long chain hydrophobic backbone copolymer which backbone copolymer comprises addition copolymerized hydrophobic co-monomers.

5. A tinter according to claim 4 wherein one end of the long chain hydrophilic poly(alkylene glycol) moiety forms a mono-ester with an addition copolymerized comonomer containing a carboxylate group.

6. A tinter according to claim 4 wherein the backbone copolymer also comprises a) dependent hydrophobic groups chosen from aromatic groups and/or long chain aliphatic groups containing a chain of at least 14 carbon atoms and b) dependent hydrophilic groups chosen from acid groups, acid anhydride groups and/or groups containing hydroxyl.

7. A tinter according to claim 4 wherein the backbone copolymer comprises dependent hydrophilic groups chosen from hydroxyisopropyl and/or hydroxyethyl.

8. An aqueous non-blocking tinter for paints or similar coating compositions free of ethylene glycol and $C_8$ to $C_{14}$ alkyl phenyl ethoxylates, said tinter having a viscosity at 20° C. of from 0.05 to 1.5 $Ns/m^2$ and containing solid particles of pigment dispersed in a dispersant system which comprises a mixture of at least about 59 wt % water, based on the weight of the dispersant system and a dispersant having hydrophilic moieties and hydrophobic moieties capable of absorbing onto the surface of the pigment wherein
   (a) the dispersant is water-miscible, micellising and has a vapour pressure of below 1.3$N/m^2$ at 25° C.
   (b) the dispersant system also comprises a minor amount of less than 30 wt % of poly(ethylene glycol) having a weight average molecular weight of from 250 to 4,500 and
   (c) for a selected weight of pigment, the ratio of weight of water-miscible micellising dispersant to pigment is at least 5% greater than the ratio by weight of water-miscible micellising dispersant to pigment which would be present at the Daniel Flow Point of a notional tinter consisting only of the same pigment, water and the same water-miscible micellising dispersant but without component (b), the fluidity of said tinter being such that after the non-blocking tinter has been stored at 25° C. in a cylindrical bore 2 mm in diameter and 15 mm in length in an ambient relative humidity of 50% for 18 hours, a pressure of not more than 320 $MN/m^2$ is sufficient to cause the residual tinter to flow from the bore.

9. A tinter according to claim 8 wherein the dispersant system contains at least 70% by weight of water.

10. An aqueous non-blocking tinter for paints or similar coating compositions free of ethylene glycol and $C_8$ to $C_{14}$ alkyl phenyl ethoxylates, said tinter having a viscosity at 20° C. of from 0.05 to 1.5 $Ns/m^2$ and containing solid particles of pigment dispersed in a dispersant system which comprises a mixture of water which constitutes a predominant amount of the dispersant system on a weight basis and a dispersant having hydrophilic moieties and hydrophobic moieties capable of absorbing onto the surface of the pigment wherein
   (a) the dispersant is water-miscible, micellising and has a vapour pressure of below 1.3$N/m^2$ at 25° C.
   (b) the dispersant system also comprises a minor amount of poly(ethylene glycol) having a weight average molecular weight of from 250 to 4,500 and
   (c) for a selected weight of pigment, the ratio of weight of water-miscible micellising dispersant to pigment is at least 5% greater than the ratio by weight of water-miscible micellising dispersant to pigment which would be present at the Daniel Flow Point of a notional tinter consisting only of the same pigment, water and the same water-miscible micellising dispersant but without component (b), the fluidity of said tinter being such that after the non-blocking tinter has been stored at 25° C. in a cylindrical bore 2 mm in diameter and 15 mm in length in an ambient relative humidity of 50% for 18 hours, a pressure of not more than 320 MN/m² is sufficient to cause the residual tinter to flow from the bore.

11. An aqueous non-blocking tinter for paints or similar coating compositions free of ethylene glycol and $C_8$ to $C_{14}$ alkyl phenyl ethoxylates, said tinter having a viscosity at 20° C. of from 0.05 to 1.5 Ns/m² and containing solid particles of pigment dispersed in a dispersant system which comprises a mixture of at least about 59 wt % water, based on the weight of the dispersant system, and a dispersant having hydrophilic moieties and hydrophobic moieties capable of absorbing onto the surface of the pigment wherein (a) the dispersant is water-miscible, micellising and has a vapour pressure of below 1.3N/m² at 25° C.

(b) the dispersant system also comprises a minor amount of poly(ethylene glycol) having a weight average molecular weight of from 250 to 4,500 and (c) for a selected weight of pigment, the ratio of weight of water-miscible micellising dispersant to pigment is at least 5% greater than the ratio by weight of water-miscible micellising dispersant to pigment which would be present at the Daniel Flow Point of a notional tinter consisting only of the same pigment, water and the same water-miscible micellising dispersant but without component (b), the fluidity of said tinter being such that after the non-blocking tinter has been stored at 25° C. in a cylindrical bore 2 mm in diameter and 15 mm in length in an ambient relative humidity of 50% for 18 hours, a pressure of not more than 320 MN/m² is sufficient to cause the residual tinter to flow from the bore.

12. An aqueous non-blocking tinter for paints or similar coating compositions free of ethylene glycol and $C_8$ to $C_{14}$ alkyl phenyl ethoxylates, said tinter having a viscosity at 20° C. of from 0.05 to 1.5 Ns/m² and containing solid particles of pigment dispersed in a dispersant system which comprises a mixture of water which constitutes the predominant amount of the dispersant system on a weight basis and a dispersant having hydrophilic moieties and hydrophobic moieties capable of absorbing onto the surface of the pigment wherein (a) the dispersant is water-miscible, micellising and has a vapour pressure of below 1.3N/m² at 25° C.

(b) the dispersant system also comprises a minor amount of less than 30 wt % of poly(ethylene glycol) having a weight average molecular weight of from 250 to 4,500 and (c) for a selected weight of pigment, the ratio of weight of water-miscible micellising dispersant to pigment is at least 5% greater than the ratio by weight of water-miscible micellising dispersant to pigment which would be present at the Daniel Flow Point of a notional tinter consisting only of the same pigment, water and the same water miscible micellising dispersant but without component (b), the fluidity of said tinter being such that after the non-blocking tinter has been stored at 25° C. in a cylindrical bore 2 mm in diameter and 15 mm in length in an ambient relative humidity of 50% for 18 hours, a pressure of not more than 320 MN/m² is sufficient to cause the residual tinter to flow from the bore.

* * * * *